United States Patent [19]

MacIntyre

[11] 4,143,355
[45] Mar. 6, 1979

[54] CHARACTER RECOGNITION SYSTEM

[75] Inventor: Robert M. MacIntyre, Anaheim, Calif.

[73] Assignee: Signature Guardian Systems, Inc., Atlanta, Ga.

[21] Appl. No.: 828,329

[22] Filed: Aug. 29, 1977

[51] Int. Cl.² .............................................. G06K 9/18
[52] U.S. Cl. .............................. 340/146.3 C; 235/449; 235/474
[58] Field of Search .............................. 340/146.3 C; 235/61.11 D, 61.12 M, 449, 474, 493

[56] References Cited

U.S. PATENT DOCUMENTS

| | | | |
|---|---|---|---|
| 3,391,387 | 7/1968 | Flores | 340/146.3 C |
| 3,558,860 | 1/1971 | Bauldreay et al. | 235/474 |
| 3,571,793 | 3/1971 | Britt | 340/146.3 C |
| 3,627,990 | 12/1971 | Sallach | 235/474 |
| 3,796,861 | 3/1974 | Hirata et al. | 235/61.11 D |
| 3,818,446 | 6/1974 | Benson | 340/146.3 C |
| 3,831,009 | 8/1974 | McMillin | 235/474 |

Primary Examiner—Leo H. Boudreau
Attorney, Agent, or Firm—C. A. Phillips

[57] ABSTRACT

A character recognition system such as employed for determining characters formed with magnetically impregnated ink on a check wherein a plurality of sequential pulses are generated for each of a plurality of successive regions along a said character responsive to the movement through the system of the check, and wherein there is included means synchronous with clock pulses at a rate equal to the timing pulse rate divided by the quantity of said plurality for determining the discrete signal areas to be observed and decoded, decoding being only in terms of the presence or absence of discrete signal levels of positive and negative pulses.

14 Claims, 5 Drawing Figures

CHARACTER RECOGNITION SYSTEM

BACKGROUND OF THE INVENTION

1. Field of the Invention

This invention relates to character recognition systems, and particularly to a system employing a single gap magnetic sensing head for reading characters of the so called E-13B character font, the characters typically being formed on paper by an ink containing magnetic particles. The print specifications appear in ANSI X3.2-1970, published by American National Standards Institute, Inc.

2. General Description of the Prior Art

In single gap character reading systems, a single analog input waveform is obtained by passing the character to be sensed beneath a magnetic transducer having a single flux gap. The signal generated by this head is a derivative waveform representing the rate of change of magnetic flux linking the head as the characters are scanned. Since the distribution of ink, and thus flux, associated with each different character is unique, the waveform derived for each different character uniquely identifies that character.

A variety of systems have been proposed in the past, and they generally fall into two main groups—those using waveform correlation techniques, and those employing pulse, hybrid and miscellaneous techniques. With respect to the latter group, they may be further categorized in terms of their use of binary, ternary, multi-level (more than ternary), and other generally more complex waveform classifications. The present invention employs a ternary form of classification, and U.S. Pat. Nos. 3,363,756, 3,541,508, and 3,571,793 are particular examples of systems using this classification. Additionally, U.S. Pat. No. 3,818,446, although basically a binary type, is of interest.

Quite significantly, a number of the patents recognize the problem of accurately identifying the position of detected signals in terms of their recorded position on recorded media. To overcome this problem, the correlation type systems generally rely on maintaining a rather critical stability of delay lines, and the pulse type systems depend heavily for their accuracy on the rate and commencement of decoding pulses from a pulse generator which must be extremely accurately timed. Heretofore this timing has generally depended upon the derivation of a reference time from a character to be decoded, and, unfortunately, this requires that the speed of movement of the document containing the character and pulse rate be maintained with very close limits, which is difficult and expensive. Accordingly, for the reasons cited, and others, existing character reading systems are generally complex and expensive.

It is an object of the present invention to overcome the aforementioned and other problems present with existing character recognition systems, and particularly to provide an improved system wherein the system tolerances are significantly relaxed, enabling required accuracy to be achieved at a reduced cost.

SUMMARY OF THE INVENTION

In accordance with this invention, clock pulses used in detecting and decoding characters printed on a document are derived from a mechanical clock pulse encoder moving in synchronism with relative movement by the reading head of the system. The finally developed pulse rate (occurrences during scanning of one character) is a multiple (5 to 10) of the number of significant discrete segments (e.g., eight) of a character scanned. The position of the time of the first one of a multiple to coincide with a first significant signal from the read head determines an index position for the system, and thereafter, each fifth pulse (in this example) is employed to determine the position of significant data signals detected by the reading head. Those detected are discriminated in terms of minimum level and digital representation of positive signals stored in a first shift register and digital representation of negative signals stored in a second shift register. The outputs of the registers are fed to a decoder which determine from them the identity of a particular character.

DETAILED DESCRIPTION OF THE DRAWINGS

Figure 1:
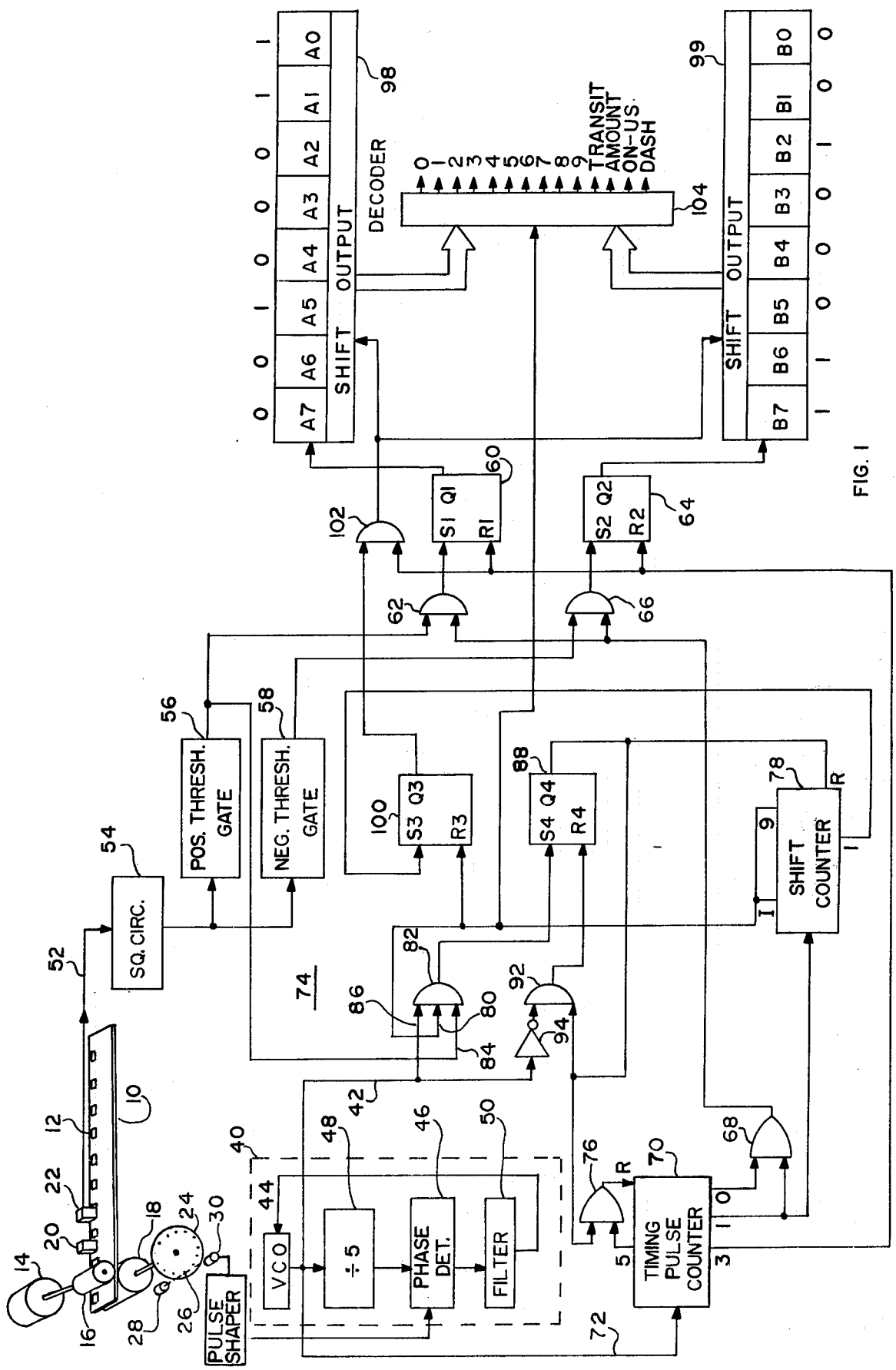
FIG. 1 is a schematic illustration of an embodiment of the invention.

Referring to FIG. 1, a document 10 having on it in-line characters 12 written in magnetizable ink would be read by first turning on motor 14 and placing the document in a position, whereby it is frictionally engaged between motor driven roller 16 and idler 18. It is thereby moved over a magnetizing head 20 and then by single gap, rate-of-change-of-flux, read head 22. As shown, motor 14 also drives, through document 10 and idler roller 18 (frictionally closely following the movement of document 10), encoding disc 24. Disc 24 has a series of circularly arranged openings 26 through which a light source 28 directs a beam which is picked up by photodetector 30.

Figure 2:
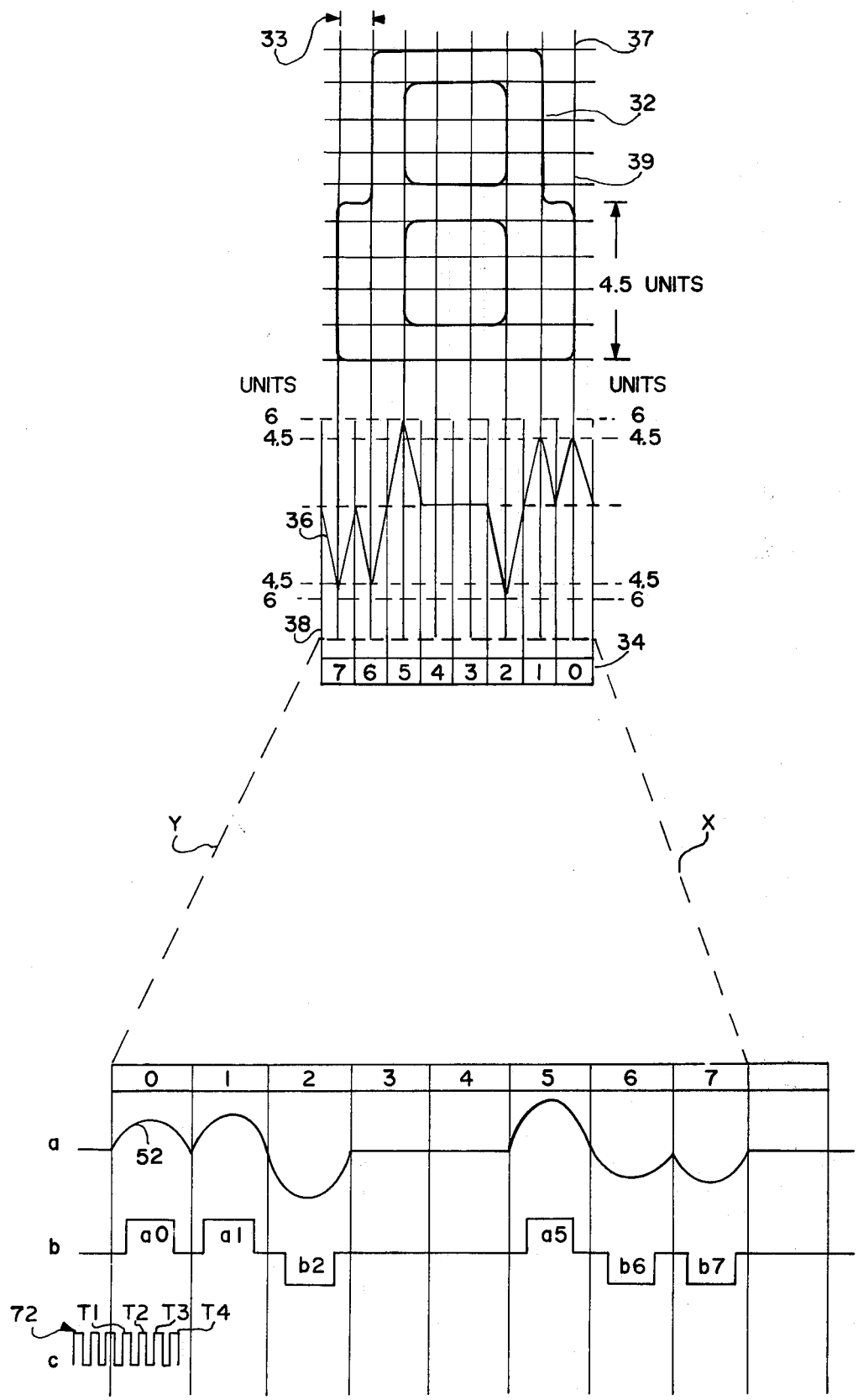
FIG. 2 is a diagram illustrating an example of the E-13B format, the idealized rate-of-change of flux output from a transducer sensing a digit 8 in accordance with this format, and a series of electrical waveforms related to the reading of this character.

The characters 12 to be read are written in a conventional E-13B font, and are read from right to left. In the illustrated example, the numeral 8, element 32 in FIG. 2, is the first character to be read, and the operation of the system will be explained in terms of reading this character. As will be noted in FIG. 2, the E-13B font configuration may be indicated in terms of a 7×9 matrix of 0.013 inch squares and in terms of sequence of detection. It is to be noted that there are seven horizontally arranged significant data segments 33 to be sampled for each character, and these are detected in time intervals 34, further labelled 0–7. It is to be still further noted in this figure that waveform peaks of idealized waveform 36 occur responsive to the detection of data segment boundaries 37 and that the waveform amplitude is proportional to the difference in adjacent segment heights. Timewise, segment boundaries 37 produce the mid points of the discrete time intervals 34, having boundaries 38.

In accordance with this invention, a plurality of clock pulses are obtained for each completion of movement of a data segment 33 of a document through the system, and, as an example, a rate of 5 to 1 is chosen. As one means of accomplishing this, the circular distance between openings 26 on disc 24 are made such that for each 0.013 peripheral inch of travel of roller 18, and thus the distance of travel of document 10, the disc rotates a distance sufficient to move one opening from a point of illumination and an adjacent opening to a point of illumination, by light source 28. In this manner, one pulse per segment travel of a document is provided as an output by photodetector 30 which is responsive to the pulsed light which occurs as disc 24 rotates. This output is fed through pulse shaper 25 (which amplifies and squares) to phase-lock-loop (PLL), five times, multiplier 40 which provides as an output on lead 42 five pulses for each 0.013 inch of travel for each document as shown in waveform c in FIG. 2. This output comprises clock pulses for generally controlling the system. Multiplier 40 functions conventionally, whereby the output of voltage control oscillator (VC0) 44 is stabilized at five times the input frequency applied to phase detector 46. This is accomplished by PLL 40 wherein the output of VC0 44 is divided by five by divider 48 and is provided as a second input to phase detector 46. The difference or error signal is supplied to low pass filter 50 which provides a control input to VCO 44 to maintain the output of VCO 44 at precisely five times the per segment output of photodetector 30.

Thus, at this point, it has been shown how the data signal output (waveform a of FIG. 2) and clock outputs (waveform c of FIG. 2) are derived.

Figure 3:
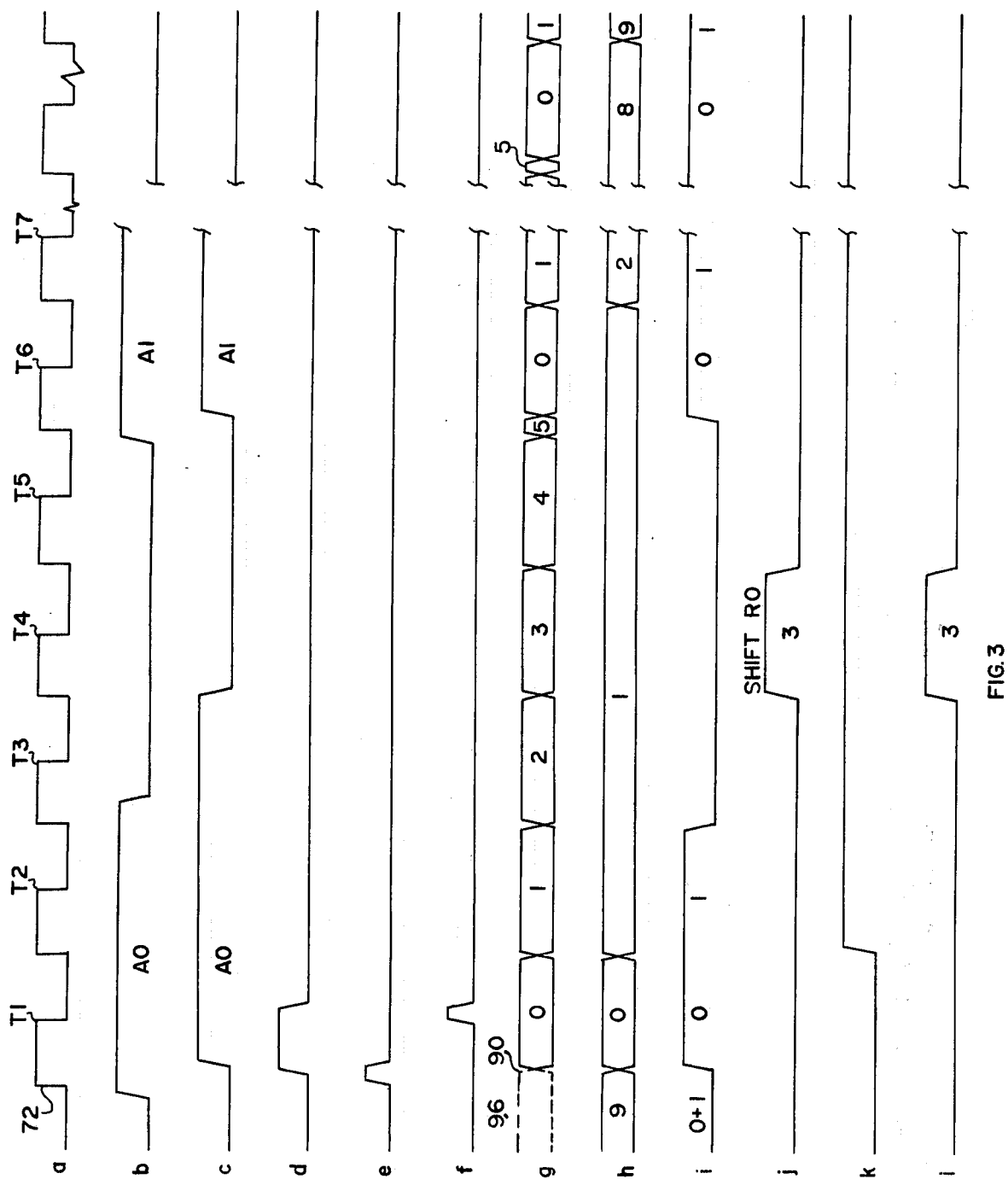
FIG. 3 contains a series of electrical waveforms particularly illustrating the timing of the operations of the embodiment of the invention shown in FIG. 1.

The data signal output 52 (FIG. 1) from read head 22 is amplified and squared by squaring circuit 54 (waveform b of FIGS. 2 and 3) and fed to positive and negative gate threshold circuits 56 and 58 wherein, in each circuit, passage of signals of a lesser amplitude than a relatively three and one-half units (units illustrated by squares 39 in FIG. 2) with respect to the 8 digit is blocked. This is in contrast to a normally minimum significant signal slightly more than 1 unit and a normally maximum signal of 9 units, as will be further discussed below. When the input to positive threshold circuit 56 exceeds the threshold, it emits a logical 1 (otherwise a logical 0 output), and when the input to negative threshold gate 58 exceeds the threshold (a negative threshold) in the negative direction, a logical 1 is emitted, otherwise a logical 0 is emitted. Thus, gates 56 and 58 (and non-linear portion of squaring circuit) can be considered the "dividing line" between the analog and digital portions of the system. Data a from threshold circuit 56 is controllably gated to the set input S1 of data latch 60 by AND gate 62, and data b is controllably gated from threshold circuit 58 to data latch 64 by AND gate 66, the data being strobed (waveform i of FIG. 3) through by the 0 and 1 count responsive true outputs (combined by OR gate 68) of timing pulse counter 70, a divide-by-five decoding counter (e.g., Motorola type MC14017B connected to decode counts 0, 1, 3 and 5), driven by clock pulses T1 and T2 from multiplier 40. The output of counter 70, shown in waveform g of FIG. 3, controls certain other functions, as will be further explained.

Assuming a start-up state with motor 14 running, and prior to the insertion of a document in the system, timing pulses 72 (waveform a of FIG. 3) will be fed from multiplier 40 to timing circuit 74 with the initial effect of timing pulse counter 70 being repeatedly cycled through full counts (being reset each time through OR gate 76, connected as shown with one input connected to the state 5 output of counter 70 and an output connected to the reset input of counter 70). As this recycling occurs, each state 1 output is fed as a clocking pulse to the clock input (C) of shift counter 78 (e.g., Motorola type MC14017B connected to count 0-9 and decode count 9) until shift counter 78 reaches state 9 (waveform h of FIG. 3). When this occurs, the state 9 output, which is coupled as shown to the inhibit input of counter 78, causes the counter to hold at this state. After this point, the system is ready to receive a check or other document 10 for reading of characters thereon, and it will be assumed that for purposes of explanation, the first character 32 to be read is the digit 8 as shown in FIG. 2.

To examine the reading process, and with the system in the state already described, the state 9 output of counter 78 is supplied to input 80 of AND gate 82, and thereafter, upon the occurrence and coincidence of the first data pulse (a0 of waveform b of FIGS. 2 and 3) applied to input 84 of AND gate 82 and timing pulse T1 (waveform a of FIG. 3) is applied to input 86 of AND gate 82, AND gate 82 will become true and provide a set input (waveform e of FIG. 3) to reset latch 88. This causes a true output (waveform d of FIG. 3) on Q4 terminal of latch 88 which is applied as a reset (R) input to shift counter 78 to reset it, and this true output is also fed through OR gate 76 to the reset input of timing pulse counter 70 to reset it, setting both of these counters to state 0 as shown by waveforms g and h, respectively, of FIG. 3. Additionally, this true output of reset latch 88 is applied to one input of AND gate 92, and as soon as timing pulse T1 falls to 0, inverter 94 (fed this timing pulse) supplies a true input to the other input of AND gate 92, and the output of AND gate 92 (waveform f) immediately resets latch 88. Prior to its reset, timing pulse counter 70 can be in any of its allowed states, and this is indicated by the dashed line 96 of waveform g respectively this waveform prior to reset action. After its reset, timing pulse counter 70 starts its useful function at state 0, and coincident with timing input pulses T1 and T2, successive state 0 and state 1 outputs of counter 70 are supplied through OR gate 68 as waveform i to AND gates 62 and 66, and with there being data a0 pulse present at the input of AND gate 62, this pulse is strobed through latch 60 to flip-flop A7 (waveform c of FIG. 3) of a data (positive) eight bit shift register 98. With the absence of b data (waveform b of FIG. 2), a 0 is registered by register 67 of b data (negative) shift register 99.

Additionally, when state 1 of timing pulse counter 70 occurs, it is applied to the clock (C) input of shift counter 78, and shift counter 78 is stepped to a state 1, and this state 1 is applied to the set S3 input of shift control latch 100, and this causes an output on the Q3 terminal of this latch to be applied to one input of shift control AND gate 102 and temporarily held thereon (waveform k). Next, and with the application of timing pulses T3 and T4 to timing pulse counter 70, the state 3 output (waveform g) of timing pulse counter 70 is applied to reset terminals R1 and R2 to reset latches 60 and 64 (waveform e) to ready the latches for input of additional data. At the same time, the pulse of waveform 1 is also applied as waveform j to the second input of AND gate 102 to make it true, and its true output is applied as a shift pulse to shift registers 98 and 99 to ready them to receive the next data.

Next, timing pulse counter 70 is counted up two counts to state 5 (by pulses T5 and T6), at which time (the time duration of state 5 in waveform g is exaggerated, being actually shorter than is shown) timing pulse counter 70 is reset as previously described, and then during states 0 and 1, it applies data strobe pulses (AND gates 62 and 66) to thus enable data pulse a1 to be applied through latch 60 to shift register 98, and coordinately, the 0 data state to be strobed via AND gate 66 and latch 64 of shift register 99 (at this point data will have been shifted into flip-flops A7 and A6 of shift register 98 and flip-flops B7 and B6 of shift register 99). Concurrently with the occurrence of state 1, shift counter 78 is shifted to state 2. Then, upon state 3 of timing pulse counter 70, latches 60 and 64 are again reset, and by means of AND gate 102, shift registers 98 and 99 are enabled to receive new data.

Thereafter, and by the same system of functions described, data would be shifted as per waveform b (FIG. 2), and the register states of shift registers 98 and 99 would finally appear as indicated in FIG. 1.

With the occurrence of the next state 1 output of timing pulse counter 70, shift counter 78 is shifted to state 9 which provides a true or data valid input to decoder 102, which permits the transfer of the contents of registers 98 and 99 to decoder 104.

Figure 4:
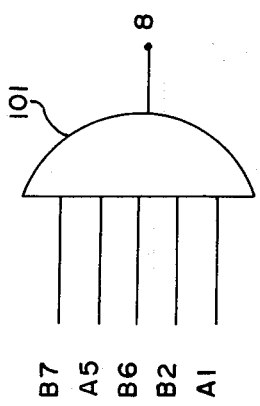
FIGS. 4 and 5 are electrical schematic diagrams illustrating the connections of decoding elements for detecting the presence of certain characters.

Decoder 104 is conventional insofar as input and output gating is concerned, effecting AND and inverting operations (performed by simple AND gates and inverters) as indicated by the following logic equations with terms identifying flip-flop states of registers 98 and 99:

|  | | | | | | | |
|---|---|---|---|---|---|---|---|
|  | 0 = B7 | A6 | B1 | $\overline{12}$ | $\overline{8}$ | | |
| on-us | 12 = B7 | A6 | B5 | A4 | B3 | | |
|  | 8 = B7 | A5 | B6 | B2 | A1 | | |
| amount | 11 = B7 | A5 | B4 | A3 | B2 | | |
| dash | 13 = B7 | A5 | B4 | $\underline{A2}$ | $\underline{B1}$ | | |
| transit | 10 = B7 | A5 | B3 | $\underline{13}$ | 11 | $\overline{8}$ | |
|  | 6 = C7 | B6 | A5 | $\underline{B2}$ | | | |
|  | 9 = C7 | B6 | B2 | $\underline{B5}$ | $\underline{4}$ | | |
|  | 4 = C7 | B6 | A4 | $\underline{A2}$ | $\underline{6}$ | | |
|  | 5 = C7 | C6 | B5 | B4 | $\underline{A1}$ | $\overline{7}$ | $\overline{3}$ |
|  | 7 = C7 | C6 | B3 | A2 | $\underline{A5}$ | $\overline{A1}$ | $\overline{B4}$ |
|  | 3 = C7 | C6 | B2 | A1 | $\underline{A5}$ | | |
|  | 2 = C7 | C6 | C5 | B4 | B3 | $\overline{1}$ | |
|  | 1 = C7 | C6 | C5 | B4 | A2 | $\overline{A3}$ | | where $C7 = \overline{A7 + B7}$ $C6 = \overline{A6 + B6}$ $C5 = \overline{A5 + B5}$ Referring to the equation for the digit 8, the decoding circuitry for this equation is illustrated in FIG. 4, being constructed of a single AND gate 101. With the indicated flip-flops being true for the digit 8, the output of AND gate 101 of FIG. 4 and the 8 output of decoder 104 (FIG. 1) would be true, thereby providing an indication of the recognition of the character 8.

To continue the examination of the functioning of the system, the 9 responsive true output of shift control counter 78 is also applied to the reset R3 input of latch 100 which disables gate 102, preventing any shift enabling pulses from reaching the shift register from timing pulse counter 70 (timing pulse counter 70 continues to recycle, but shift control counter 78 remains at state 9) until there is detected the presence of a properly timed new bit of data. Thereafter, when this occurs, which is signaled by the full concurrence of a timing pulse, an a0 data pulse for the next character, and the presence of state 9 as aforesaid, AND gate 82 is caused to be made true. The true state of AND gate 82 is then applied as the set S4 input of latch 88, causing it to set, and the resulting Q4 output of latch 88 is applied as a reset input to reset shift control counter 78 and is applied through OR gate 76 as a reset input to reset timing pulse counter 70. Additionally, this Q4 output of latch 88 is applied to one input of AND gate 92 and, thereafter, when the instant pulse output of multiplier 40 drops to zero, this state is converted to a true state by inverter 94 and is applied as a second input to AND gate 92 to make it true, and its true state is applied to the reset R4 input of latch 88 to rapidly reset latch 88 to enable it to similarly respond to provide reset outputs for the counters at the beginning of the next character to be recognized.

At this point the circuit is ready for the reading of the next character of character 12's on document 10, and the reading of the next and following characters will be effected in the same manner as thus far described.

A particular aspect of this invention is the detection and discrimination process of dealing with the amplitudes of signal outputs of rate-of-change-of-flux read head 22.

Referring to FIG. 2, first note that for a given character, the amplitude is equal to the differential length of the ink segments at the segment boundaries. For E-13B font, this varies from the full character height of nine units to slightly more than one unit, e.g., the 6 during time interval 3 as this produces this lower amplitude. Further, there exists noise pulses which are present and which are proportional to the height of the character segment and to the number of edges. For example, the 6 during time interval 4 has a total height of three units and six edges. As a practical matter, the noise signal during time interval 4 can be approximately the same amplitude as the character signal during time interval 3. In recognition of this, and in accordance with the present invention, all signal pulses 3 units or less in amplitude are not used for non-complemented gate inputs. Also, the condition of neither positive nor negative pulse will only be utilized for time intervals beyond the area of the character being identified. With reference to the logic equations set forth above, reference is particularly made to the equations for the numerals 6, 9, and 4; and with respect to segment signals for these characters, the following illustrates ideal signal levels:

| time period | 7 | 6 | 5 | 4 | 3 | 2 | 1 |
|---|---|---|---|---|---|---|---|
| character | | | | | | | |
| 6 levels | 0 | −7 | +6 | 0 | −1½ | +2½ | −2 |
| 9 levels | 0 | −5 | +3 | 0 | 0 | −4 | −3 |
| 4 levels | 0 | −7 | 0 | +6 | 0 | −3 | 0 |

It must be assumed that when character 9 is read, A5 might be true, and therefore, the decoder would indicate a 9 and a 6. This is resolved by adding the term $\overline{B2}$ to the logic equation for 6 as shown above. Note that the idealized waveform for 6 at time interval 2 would have an amplitude of +2½ or 5½ units from the assumed negative threshold of three units. This can be carried further even if there is no conflict. For example, at time interval 2, the ideal waveform for 4 is −3 units. In formulating the logic equation for 4, it can be assumed that at least A2 is not true, and therefore that the logic equation may be written as follows:

$4 = C7\ B6\ A4\ \overline{A2}$, and likewise the equation for 9 may be written:

$$9 = C7\ B6\ B2\ \overline{B5}.$$

Likewise, this can be carried further depending upon the system penalties for false acceptance versus false rejection of a character.

Figure 5:
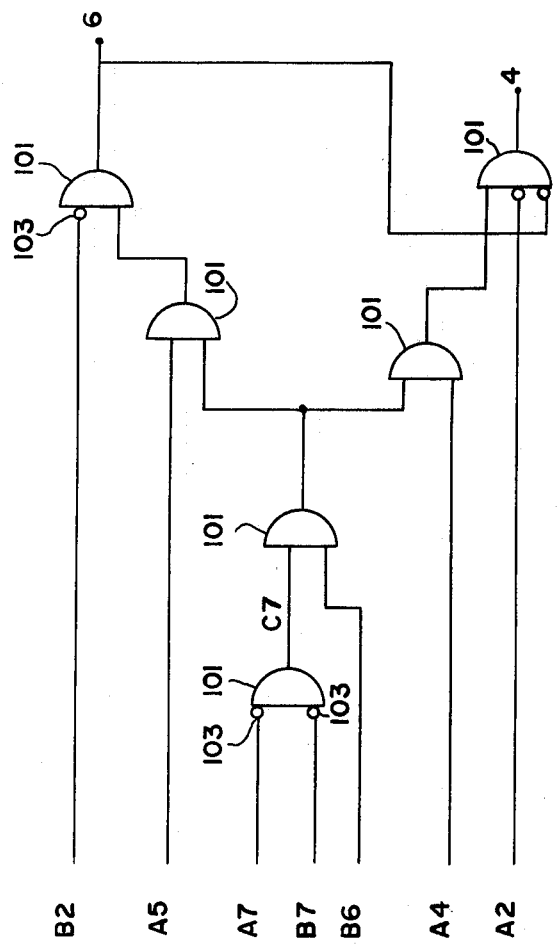

Still an additional step can be taken to resolve noise induced ambiguities by adding a 6 to the equation for 4. Then, $4 = C7\ B5\ A4\ \overline{A2}\ 6$. An implementation of this equation and of the equation for the character 6 are shown by the combination of AND gates 101 and inverter 103 in FIG. 5.

The first data bit for each character is always positive, and thus it does not provide any distinguishing features for decoding. However, its absence may be used to indicate circuit malfunction. It is to be further noted that all waveform pulses which are present during time interval 7 are negative, and thus it is only necessary to provide six lines, representing time intervals 1–6 from register 98 to decoder 104. It is to be further noted that not all E-13B characters are symmetrical about the vertical graphical center. Thus, the non-symmetrical characters will not, therefore, exhibit reversed state patterns (shift register 98 versus shift register 99). In addition to register 98 always being shifted to a 1 state for the A0 position, the B0 and B7 positions are zero, unless there is a malfunction. Thus, a malfunction might be decoded as A0 + B0 + A7, if such appears at data valid time.

While in the present invention as shown phase-lock-loop multiplier 40 is employed to effect the occurrence of a precise and a constant multiple of pulses for each 0.013 inch of travel of a document, it is to be appreciated that this multiple can be achieved by mechanical means, such as by making the timing disc larger and multiplying the number of openings in the timing wheel for this distance of travel of a document. A still alternate approach might employ a timing wheel, gear driven by roller 18, providing the gear train has zero effective backlash.

While a simple AND-OR type logic is illustrated for the timing and logic circuitry, it is to be appreciated that NAND and NOR logic elements may be employed to effect equivalent logic functions.

As a particular feature of this invention decoding of the registered data is on a ternary basis as indicated by the C terms in some of the equations, these C terms being based upon the absence of data pulses "outside" of the segments of characters and specifically in time intervals 5, 6, and 7. Actually, the C terms are based on the absence of data pulses outside of the "short" characters, being characters 1–7 and 9. For example, 1 has a width of four segments. Therefore, the trailing edge of the fourth segment will generate a pulse (negative) at the mid point of time interval 4. Since there is no more magnetic material after the fourth segment, there will be no pulses during time intervals 5, 6, and 7 for the 1 (and no noise generated by magnetic material). Therefore, logic terms C7, C6 and C5 are used in the logic equation for 1. As called for by the ANSI X3.2-1970 reference above, the edge of the right side of character 1 is 0.052 inch (4 units) high, and therefore it will generate an a0 data pulse of 4 units amplitude during time interval 0. Moving to the left 0.013 inch, there is no change in height of the magnetic material of this character. Hence, ideally, there will be no pulse at time interval 1. However, suppose imperfections in the magnetic material (e.g., a void in the magnetic material is equivalent to a height reduction of ½ unit) cause noise. In this case, the noise would be a negative pulse of $-\frac{1}{2}$. Because of such possibilities, no C1 term is used. So, therefore, use of the C terms is based on the absence of data pulses "outside" of the characters, i.e., time intervals ---
5, 6, 7 for 1, 2
6, 7 for 3, 5, 7
7 for 4, 6, 9.
---

Of course, the other characters (0, 8, transit, amount, on-us, dash) are seven segments (8 time intervals) wide so no C terms are used in the decoder equations for those other characters. Further, character pulses less than approximately one-third of that detected for a maximum height character are not used in normal ("normal" is used in the sense of "normal" and "complement", e.g., where A5 is a "normal" or true designation and $\overline{A5}$ is a designation of the "complement" of this "normal" designation) logic of decoding. However, significantly, the logic complements of amplitudes less than this are used to resolve conflicts when some pulses are distorted by noise.

From the foregoing, it will be appreciated that the applicant has provided an improved character recognition system in which the control pulses are generated in terms of the actual movement of a document, and certain of these pulses are selected to time the detection and processing of data. This enables the construction of a system which is extremely accurate, is relatively insensitive to variations in character quality, and inherently uncomplicated and inexpensive.

Having thus disclosed my invention, what is claimed is:

1. Process of sequentially reading and identifying magnetic characters on a document from a predetermined set of characters having adjacent discrete segments of greater and lesser totality of magnetic flux across the characters in a prescribed path, including the steps of:
   driving an endless idler member by engagement of the surface of said idler member with the surface of a driven second endless member;
   generating a timing pulse train which is proportional to the surface speed of said idler member;
   directing said document along a prescribed path between said idler member and said driven member so that the surface of said document drives said idler member by engaging the surface of said idler member, whereby the timing pulse train is generated at a rate proportional to the rate of travel of the document along said path;
   feeding said timing pulses to a counter;
   disposing a transducer adjacent to said prescribed path for generating a waveform having a plurality of signal levels including positive and negative excursions generated by the changes in the magnetic flux of said discrete segments of said characters;
   detecting the change in amplitude and polarity of said waveform;
   actuating said counter when the first portion of said waveform is generated;
   successively storing, in sequence in a first storage zone and shifting according to signals from said counter, first state signals which correspond to the detected changes of said waveform which are positive and of greater amplitude than a selected level and also second state signals which correspond to when no such changes are detected;

successively storing, in sequence in a second storage zone and shifting according to signals from said counter, first state signals which correspond to detected changes of said waveform which are negative and of a greater amplitude than a selected level and also second state signals which correspond to when no such changes are detected;

continuing the storing in said first zone and in said second zone of state signals;

establishing in a decoder a plurality of electrical paths which compare simultaneously the state signals from both of the zones, the electrical paths respectively being representative of said predetermined characters; and feeding the successive state signals from said zones to said decoder, in accordance with signals from said pulse train, for producing signals from said decoder which are representative of said characters.

2. The process defined in claim 1 wherein a prescribed number of time pulses is generated for the length of each discrete region of said document measured along its path of travel.

3. The process defined in claim 1 wherein the step of moving said document along a prescribed path includes functionally engaging said documents and moving the same while being frictionally held.

4. The process defined in claim 3 wherein an endless surface is employed to functionally engage and wherein the step of generating the pulse train includes generating the pulse from movement synchronized with the movement of said endless surface.

5. A character recognition system for reading characters sequentially appearing on a document comprising:
  first signal means including a transducer and movement means for relatively moving said document continuously with respect to said transducer for providing an electrical waveform from said transducer having a plurality of signal levels including positive and negative excursions responsive to discrete segments of a said character;
  reference signals means continuously coupled to movement of said document for generating, as a reference signal, a train of pulses continuously synchronized with the movement of said document, at least one of said pulses corresponding in timed relation with the occurrence of a signal from said transducer responsive to each of said segments of a said character;
  amplitude and polarity discrimination means responsive to said first signal means for providing, separately:
    a first output which is of a first state in instances when a discrete region of said waveform is positive and is of greater amplitude than a selected positive amplitude level and of a second state when it is not, and
    a second output which is of a first state in instances when a said discrete region of said waveform is negative and is of a greater amplitude than a said selected negative amplitude level and of a second state when it is not;
  first storage means responsive to said first output of said amplitude and polarity discrimination means and said reference signal for storing said signal states;
  second storage means responsive to said second output of said amplitude and polarity discrimination means and to said reference signal for storing said signal states; and
  decoding means responsive to said storage means, and the combination of said stored states for indicating the identity of a said character.

6. A character recognition system as set forth in claim 5 wherein said reference signal means generates, repeatedly, a precise and like plurality of said pulses for each instance of relative movement between said document and said transducer equal to the length of a said discrete region of said document measured along the direction of said relative movement.

7. A character recognition system as set forth in claim 6 wherein said movement means comprises means for moving said document, and said reference signal means includes a rotable member for frictional engagement with a surface of said document, and means for providing pulses during the rotation of said rotable member, whereby movement of said document and said reference signal means are synchronized.

8. A character recognition system as set forth in claim 7 wherein said reference signal means comprises means for generating said train of pulses responsive to the rotation of said rotable member.

9. A character recognition system as set forth in claim 6 wherein the combination of said stored states of said decoding means for indicating the identity of at least one said character includes at least a said second state for at least one of said stored states.

10. A character recognition system as set forth in claim 9 wherein, in the decoding of at least one of said discrete segments of at least one character, said decoding means is responsive to said second state being present in both said first and second outputs.

11. A character recognition system as set forth in claim 10 wherein said second state is present in both said first and second outputs responsive to at least the last said discrete segment of a character sensed by said transducer, and the character sensed is one of the group consisting of the numerals 1-7 and 9.

12. A character recognition system as set forth in claim 11 wherein said decoding means is responsive to said second state being present in both said first and second outputs responsive to the next to last of said segments being sensed by said transducer, and the character on said document being sensed is one of the group consisting of the numerals 1-5.

13. A character recognition system as set forth in claim 12 wherein said decoding means is responsive to said second state being present in both said first and second outputs responsive to the second from last of said discrete segments being sensed by said transducer, and the character being sensed is one of the group consisting of the numerals 1 and 2.

14. A character recognition system for reading characters appearing on a document comprising:
  first signal means including a transducer and movement means for relatively moving said document with respect to said transducer for providing an electrical waveform from said transducers having a plurality of signal levels including positive and negative excursions responsive to discrete segments of a said character;
  reference signal means responsive to said movement means for generating, as a reference signal, a train of pulses, at least one of said pulses corresponding in timed position with each of a plurality of discrete regions along said waveform;

amplitude and polarity discrimination means responsive to said first signal means for providing, separately:
- a first output which is of a first state in instances when a discrete region of said waveform is positive and is of greater amplitude than a selected positive amplitude level and of a second state when it is not, and
- a second output which is of a first state in instances when a said discrete region of said waveform is negative and is of a greater amplitude than said selected negative amplitude level and of a second state when it is not;

first storage means responsive to said first output of said amplitude and polarity discrimination means and said reference signal for storing said signal states;

second storage means responsive to said second output of said amplitude and polarity discrimination means and to a reference signal for storing said signal states;

decoding means responsive to said storage means, and the combination of said stored states for indicating the identity of said character;

said movement means comprises means for moving said document, and said reference signal means includes a rotable member for frictional engagement with said document, whereby movement of said document and said reference signal means are synchronized;

means for generating said train of pulses responsive to the rotation of said rotable member, said means for generating said train of pulses, generating repeatedly, a precise and like plurality of said pulses for each instance of relative movement between said document and said transducer equal to the length of a said discrete region of said document measured along the direction of said relative movement; and said reference signal means comprise transducer means for providing at least one pulse-per-unit-of-travel of said rotable member responsive to the length of travel of said document corresponding to the length of a said discrete region, and further comprises signal multiplication means for multiplying said pulse-per-unit-of-travel signal by a selected multiple between 5 and 10 for finally generating said reference signal.

* * * * *